(12) United States Patent
Ding et al.

(10) Patent No.: US 10,379,653 B2
(45) Date of Patent: Aug. 13, 2019

(54) TOUCH MODULE THAT DETECTS CAPACITANCE CAUSED BY PRESSURE AT TOUCH POSITION, DRIVING METHOD THEREOF, AND DISPLAY DEVICE

(71) Applicants: Boe Technology Group Co., Ltd., Beijing (CN); Beijing Boe Optoelectronics Technology Co., Ltd., Beijing (CN)

(72) Inventors: Xiaoliang Ding, Beijing (CN); Xue Dong, Beijing (CN); Xiaochuan Chen, Beijing (CN); Haisheng Wang, Beijing (CN); Yingming Liu, Beijing (CN); Weijie Zhao, Beijing (CN); Shengji Yang, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 86 days.

(21) Appl. No.: 15/521,506

(22) PCT Filed: Oct. 27, 2016

(86) PCT No.: PCT/CN2016/103473
§ 371 (c)(1),
(2) Date: Apr. 24, 2017

(87) PCT Pub. No.: WO2017/071602
PCT Pub. Date: May 4, 2017

(65) Prior Publication Data
US 2017/0308218 A1 Oct. 26, 2017

(30) Foreign Application Priority Data
Oct. 30, 2015 (CN) .......................... 2015 1 0729661

(51) Int. Cl.
*G06F 3/045* (2006.01)
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04107* (2013.01)

(58) Field of Classification Search
None
See application file for complete search history.

(56) References Cited

U.S. PATENT DOCUMENTS 5,510,813 A  4/1996 Makinwa et al.
9,285,913 B1 * 3/2016 Kang .................... G06F 3/0412
(Continued)

FOREIGN PATENT DOCUMENTS

CN   102004573 A   4/2011
CN   103823592 A   5/2014
(Continued)

OTHER PUBLICATIONS

International Search Report for International Patent Application No. PCT/CN2016/103473 dated Feb. 7, 2017.

*Primary Examiner* — Lunyi Lao
*Assistant Examiner* — Kirk W Hermann
(74) *Attorney, Agent, or Firm* — Calfee, Halter & Griswold LLP

(57) ABSTRACT

A touch substrate includes a first transparent electrode layer, a transparent flexible dielectric layer and a second transparent electrode layer. The first transparent electrode layer comprises first touch detection electrodes arranged in an array and insulated from each other. During the touch detection period, a first touch detection signal is loaded simultaneously to the first and second transparent electrode layer, and the touch position can be determined by detecting a change in the capacitance value of each of the first touch detection electrodes. During the pressure detection period, a second touch detection signal may be loaded to one of the first transparent electrode layer and the second transparent
(Continued)

electrode layer, and the pressure in the z direction perpendicular to the surface of the touch screen can be determined by detecting a change in the capacitance value between each of the first touch detection electrodes and the second transparent electrode layer.

17 Claims, 2 Drawing Sheets

(56) References Cited

U.S. PATENT DOCUMENTS

| | | | |
|---|---|---|---|
| 2013/0162583 A1* | 6/2013 | Simmons | G06F 3/044 345/174 |
| 2013/0257797 A1* | 10/2013 | Wu | G06F 3/044 345/174 |
| 2014/0267146 A1* | 9/2014 | Chang | G06F 3/044 345/174 |
| 2014/0307186 A1 | 10/2014 | Yun et al. | |
| 2015/0268783 A1* | 9/2015 | Yoon | G06F 3/0414 345/173 |
| 2017/0038869 A1* | 2/2017 | Kim | G06F 3/0414 |
| 2017/0068368 A1* | 3/2017 | Hsiao | G06F 3/0416 |
| 2017/0123529 A1* | 5/2017 | Ho | G06F 3/044 |

FOREIGN PATENT DOCUMENTS

| | | | | |
|---|---|---|---|---|
| CN | 103907081 A | 7/2014 | | |
| CN | 205068343 U | 3/2016 | | |
| WO | 2010024495 A1 | 3/2010 | | |
| WO | WO-2013122287 A1 * | 8/2013 | | G06F 3/044 |

* cited by examiner

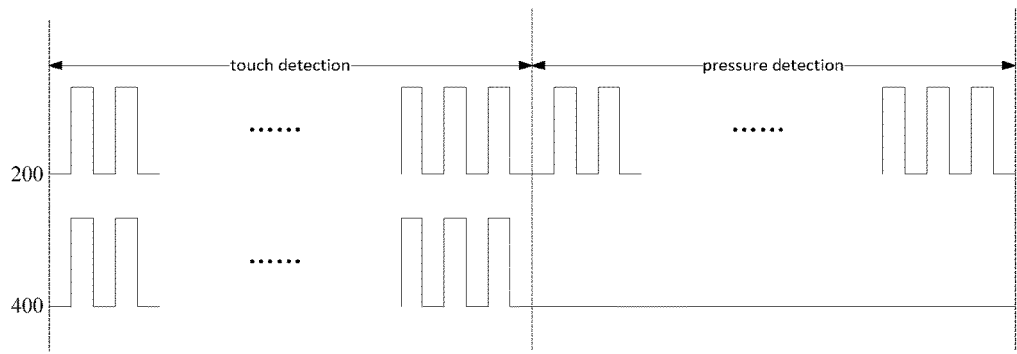

Fig.4

| | |
|---|---|
| during the touch detection period, loading a first touch detection signal simultaneously to the first transparent electrode layer and the second transparent electrode layer so as to detect a change in the capacitance value of each of the first touch detection electrodes in the first transparent electrode layer to determine the touch position | S501 |
| during the pressure detection period, loading a second touch detection signal to the first transparent electrode layer or the second transparent electrode layer so as to detect a change in the capacitance value between each of the first touch detection electrodes and the second transparent electrode layer caused by the pressure at the touch position | S502 |

Fig.5

TOUCH MODULE THAT DETECTS CAPACITANCE CAUSED BY PRESSURE AT TOUCH POSITION, DRIVING METHOD THEREOF, AND DISPLAY DEVICE

RELATED APPLICATION

The present application is the U.S. national phase entry of PCT/CN2016/103473, with an international filling date of Oct. 27, 2016, which claims the benefit of Chinese Patent Application NO. 201510729661.2, filed on Oct. 30, 2015, the entire disclosure of which is incorporated herein by reference.

FIELD OF THE INVENTION

The present disclosure relates to the field of touch display technology, and particularly to a touch module, a driving method thereof, and a display device.

BACKGROUND

With the rapid development of display technology, touch screen panels have gradually spread throughout people's lives. At present, the touch screen panels can be classified into "add on mode touch panel", "on cell touch panel", and "in cell touch panel" in terms of structure. The add on mode touch panel is a display panel having touch function whose touch module and display screen are produced separately and then adhered to each other.

Most of the current touch screen panels are only able to detect based on two-dimensional coordinates, i.e. being able to detect the touch position of a finger in the xy coordinates on the surface of the touch screen panel, while being unable to detect the pressure in the z direction perpendicular to the surface of the touch screen panel when the finger presses the screen.

SUMMARY

In view of this, embodiments of the present disclosure provide a touch module, a driving method thereof, and a display device, for realizing three-dimensional detection for the touch module.

The touch module provided by the embodiments of the present invention comprises a touch substrate, and a first transparent electrode layer, a second transparent electrode layer as well as a transparent flexible dielectric layer between the first transparent electrode layer and the second transparent electrode layer that are arranged below an opposite surface of a touch surface of the touch substrate. The first transparent electrode layer comprises first touch detection electrodes arranged in an array and insulated from each other. During the touch detection period, the first transparent electrode layer and the second transparent electrode layer are used to receive a first touch detection signal simultaneously so as to detect a change in the capacitance value of each of the first touch detection electrodes to thereby determine the touch position. During the pressure detection period, one of the first transparent electrode layer and the second transparent electrode layer is used to receive a second touch detection signal so as to detect a change in the capacitance value between each of the first touch detection electrodes and the second transparent electrode layer caused by the pressure at the touch position.

In some embodiments, the other of the first transparent electrode layer and the second transparent electrode layer is used to receive a fixed value signal during the pressure detection period.

In some embodiments, the touch module further comprises a touch detection chip for providing the first touch detection signal, the second touch detection signal, and the fixed value signal.

In some embodiments, the second transparent electrode layer is composed of a planar electrode.

In some embodiments, during the pressure detection period, the first transparent electrode layer receives the fixed value signal, the second transparent electrode layer receives the second touch detection signal, and the touch detection chip is further used to detect a signal change in each of the first touch detection electrodes.

In some embodiments, the second transparent electrode layer comprises second touch detection electrodes arranged in an array and insulated from each other, and the second touch detection electrodes and the first touch detection electrodes are in one-to-one correspondence and orthographic projections thereof on the flexible dielectric layer coincide with each other.

In some embodiments, during the pressure detection period, the touch detection chip is further used to detect a signal change in each of the second touch detection electrodes.

In some embodiments, the touch substrate is a protective substrate.

Another embodiment of the present invention provides a display device comprising a display panel, and the touch module described in any of the foregoing embodiments which may be fixed to a light exit side of the display panel, the second transparent electrode layer of the touch module is in contact with the light exit side of the display panel.

In some embodiments, the display panel may be selected from a group consisting of a liquid crystal display panel, an organic electroluminescence display panel, a cathode ray tube display panel, a plasma display panel, an electronic paper and an electroluminescent display panel.

Another embodiment of the present invention provides a driving method for a touch module which may be any touch module described in the foregoing embodiments. The method may include during the touch detection period, loading a first touch detection signal simultaneously to the first transparent electrode layer and the second transparent electrode layer so as to detect a change in a capacitance value of each of the first touch detection electrodes in the first transparent electrode layer to determine a touch position;

during the pressure detection period, loading a second touch detection signal to the first transparent electrode layer or the second transparent electrode layer so as to detect a change in a capacitance value between each of the first touch detection electrodes and the second transparent electrode layer caused by a pressure at the touch position.

In some embodiments, the method comprises: during the pressure detection period, loading the second touch detection signal to the second transparent electrode layer while loading a fixed value signal to the first transparent electrode layer; and detecting a signal change in each of the first touch detection electrodes.

In some embodiments, the method may comprise: during the pressure detection period, loading a fixed value signal to the second transparent electrode layer while loading the second touch detection signal to the first transparent electrode layer; and detecting a signal change in each of the first touch detection electrodes.

In some embodiments, the second transparent electrode layer may comprise second touch detection electrodes arranged in an array and insulated from each other, and the second touch detection electrodes and the first touch detection electrodes are in one-to-one correspondence and orthographic projections thereof on the flexible dielectric layer coincide with each other. The method may comprise: during the pressure detection period, loading the second touch detection signal to the first transparent electrode layer while loading a fixed value signal to the second transparent electrode layer; and detecting a signal change in each of the second touch detection electrodes.

In some embodiments, the second transparent electrode layer may comprise second touch detection electrodes arranged in an array and insulated from each other, and the second touch detection electrodes and the first touch detection electrodes are in one-to-one correspondence and orthographic projections thereof on the flexible dielectric layer coincide with each other. The method may include during the pressure detection period, loading a fixed value signal to the first transparent electrode layer while loading the second touch detection signal to the second transparent electrode layer; and detecting a signal change in each of the second touch detection electrodes.

According to the touch module provided by embodiments of the present invention, a first transparent electrode layer, a transparent flexible dielectric layer and a second transparent electrode layer are provided below the opposite surface of the touch surface of the touch substrate. Since the transparent flexible dielectric layer has certain elasticity, when touch substrate is subjected to a touch press, the transparent flexible dielectric layer would be compressed at the pressed point, where the distance between the first transparent electrode layer and the second transparent electrode layer would be reduced correspondingly. During the touch detection period, a first touch detection signal may be loaded simultaneously to the first transparent electrode layer and the second transparent electrode layer. Therefore, at that time, the change in the distance between the first transparent electrode layer and the second transparent electrode layer caused by the touch press would not result in charging and discharging of the capacitor formed therebetween, i.e. not affecting the first touch detection signal loaded to the first transparent electrode layer. Consequently, the touch position can be determined by detecting a change in the capacitance value of each of the first touch detection electrodes, thereby realizing two-dimensional detection of touch. During the pressure detection period, a second touch detection signal may be loaded to one of the first transparent electrode layer and the second transparent electrode layer. At that time, the change in the distance between the first transparent electrode layer and the second transparent electrode layer caused by the touch press would affect charging and discharging of the capacitor formed therebetween. Consequently, the pressure in the z direction perpendicular to the surface of the touch screen can be determined by detecting a change in the capacitance value between each of the first touch detection electrodes and the second transparent electrode layer, thereby realizing the pressure sensing function.

BRIEF DESCRIPTION OF THE DRAWINGS

FIGS. 3 and 4 are respectively schematic views showing the driving timings of touch modules provided by the different embodiments of the present invention;

FIG. 5 is a flow chart showing a driving method for a touch module provided by embodiments of the present invention.

DETAILED DESCRIPTION OF EMBODIMENTS

Figure 1:
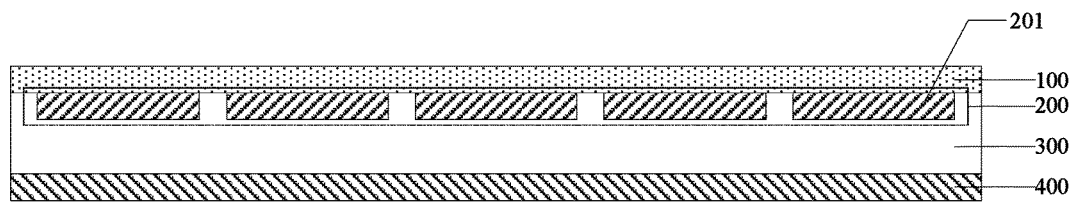
FIGS. 1 and 2 are respectively schematic views showing the structures of touch modules provided by different embodiments of the invention.

Implementations of a touch module, a driving method thereof, and a display device provided by embodiments of the invention will be described below in detail with reference to the accompanying drawings.

The thicknesses and shapes of the layers in the drawings do not reflect the real scale, but are only for the purpose of illustrating the embodiments of the present invention.

As shown in FIG. 1, a touch module provided by an embodiment of the invention comprises a touch substrate 100, and a first transparent electrode layer 200, a second transparent electrode layer 400, as well as a transparent flexible dielectric layer 300 between the first transparent electrode layer 200 and the second transparent electrode layer 400 that are arranged below an opposite surface of a touch surface of the touch substrate 100. The first transparent electrode layer 200 comprises first touch detection electrodes 201 arranged in an array and insulated from each other. During the touch detection period, the first transparent electrode layer and the second transparent electrode layer receive a first touch detection signal simultaneously so as to detect a change in the capacitance value of each of the first touch detection electrodes to thereby determine the touch position. During the pressure detection period, one of the first transparent electrode layer and the second transparent electrode layer receives a second touch detection signal so as to detect a change in the capacitance value between each of the first touch detection electrodes and the second transparent electrode layer caused by the pressure at the touch position.

The above mentioned opposite surface of a touch surface of the touch substrate 100 in the touch module refers to the surface of the touch substrate 100 opposite to the touch surface, that is, in the example shown in FIG. 1, the touch surface of the touch substrate is the upper surface, and the opposite surface of the touch surface is the lower surface.

In practice, in the above-described touch module provided by the embodiment of the invention, the touch substrate 100 may act as a protective substrate, for example, a protective cover plate. In this way, a detection electrode capable of realizing three-dimensional touch detection is integrated into the protective cover, which makes it possible to realize the pressure sensing function while detecting the two-dimensional touch, and display panels in various display modes can be compatible, resulting in a wide range of application scenes.

In the touch module provided by the embodiment of the invention, the transparent flexible dielectric layer 300 between the first transparent electrode layer 200 and the second transparent electrode layer 400 may have certain elasticity, for example, the transparent flexible dielectric layer 300 may be made from a polymer material such as polyurethane. Consequently, when the touch substrate 100 is subjected to a touch press, the transparent flexible dielectric layer 300 is compressed at the pressed point, where the distance between the first transparent electrode layer 200 and the second transparent electrode layer 400 is reduced correspondingly, so that the capacitance formed by the first transparent electrode layer 200 and the second transparent electrode layer 400 is increased. By detecting a change in the capacitance value, the magnitude of the touch pressure can be determined.

In some embodiments, the touch module may further comprise a controller (not shown in the figures) such as a touch detection chip. The touch detection chip (controller) can at least provide a first touch detection signal used in the touch detection period and a second touch detection signal used in the pressure detection period. In the touch module provided by the embodiment of the invention, each of the first touch detection electrodes 201 included in the first transparent electrode layer 200 may have a block shape.

Figure 3:
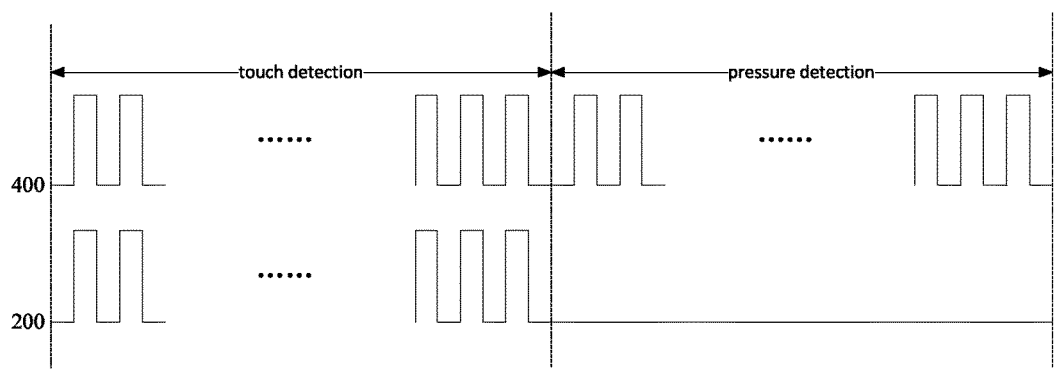

As shown in FIGS. 3 and 4, during the touch detection period, the touch detection chip may apply the first touch detection signal to each of the first touch detection electrodes 201, and then can detect a change in the capacitance value of each of the first touch detection electrodes caused by the human body capacitance upon touch, thereby determining the two-dimensional coordinates of the touch point on the screen, i.e. determining the touch position. Moreover, as shown in FIGS. 3 and 4, since the first transparent electrode layer 200 and the second transparent electrode layer 400 may simultaneously receive the first touch detection signal during this period, the potential of the second transparent electrode layer 400 is the same as that of the first transparent electrode layer 200, and the second transparent electrode layer 400 can, on the one hand, serve as a shielding layer at this time to shield interference from other signals, and on the other hand, eliminate the parasitic capacitance from the first transparent electrode layer 200. Therefore, at this time, the change in the distance between the first transparent electrode layer 200 and the second transparent electrode layer 400 caused by the touch press would not result in charging and discharging of the capacitor formed between the first transparent electrode layer 200 and the second transparent electrode layer 400, i.e. not affecting the first touch detection signal received by the first transparent electrode layer 200.

During the pressure detection period, one of the first transparent electrode layer 200 and the second transparent electrode layer 400 may receive a second touch detection signal from the touch detection chip. At that time, the change in the distance between the first transparent electrode layer 200 and the second transparent electrode layer 400 caused by the touch press would affect charging and discharging of the capacitor formed between the two transparent electrode layers. Therefore, the pressure in the z direction perpendicular to the surface of the touch screen can be detected by detecting a change in the capacitance value between each of the first touch detection electrodes 201 and the second transparent electrode layer 400, thereby realizing the pressure sensing function.

In some embodiments, the other of the first transparent electrode layer 200 and the second transparent electrode layer 400 may receive a fixed value signal during the pressure detection period. Moreover, the fixed value signal may also be provided by the touch detection chip. Thus, in some embodiments, the touch module may comprise a touch detection chip for providing the first touch detection signal, the second touch detection signal, and the fixed value signal.

In specific implementations, the signal frequencies, duty cycles and amplitudes of the first touch detection signal applied during the touch detection period and the second touch detection signal applied during the pressure detection period may be the same or different, which are not limited here.

In some embodiments, the touch detection chip may apply a signal to the first transparent electrode layer 200 or the second transparent electrode layer 400 in the following manners during the pressure detection period.

In some embodiments, as shown in FIG. 3, during the pressure detection period, the touch detection chip loads the second touch detection signal to the second transparent electrode layer 400, while loading the fixed value signal to the first transparent electrode layer 200, i.e. the level of the first transparent electrode layer 200 at that time is relatively fixed. In this way, the change in the distance between the first transparent electrode layer 200 and the second transparent electrode layer 400 caused by the touch press would result in charging and discharging of the capacitor formed between the two transparent electrode layers. Thus, the variation quantity of the capacitance value between the first transparent electrode layer 200 and the second transparent electrode layer 400 can be determined by detecting a change in the signal of each of the first touch detection electrodes 201 based on self-capacitance detection principle, thereby calculating the magnitude of the pressure.

In some embodiments, as shown in FIG. 4, during the pressure detection period, the touch detection chip loads the second touch detection signal to the first transparent electrode layer 200, while loading the fixed value signal to the second transparent electrode layer 400, i.e. the level of the second transparent electrode layer 400 at that time is relatively fixed. In this way, the change in the distance between the first transparent electrode layer 200 and the second transparent electrode layer 400 caused by the touch press would result in charging and discharging of the capacitor formed between the two transparent electrode layers. The influence of the charging and discharging process would be reflected in the detection signal of the first transparent electrode layer 200. Assuming that the detected signal amount obtained at that time is b, and the detected signal amount of the first transparent electrode layer 200 as detected by means of the capacitance generated between the finger and the first transparent electrode layer 200 during the touch detection period is a, then the detected signal amount resulting from the pressure is $f=b-a$. The larger f is, the greater the pressure value is. The pressure value can be determined in this manner.

In some embodiments, the second transparent electrode layer may consist of a planar electrode. This embodiment may be particularly applicable to the manner in which the signal is loaded as shown in FIG. 3. That is, in this embodiment, during the pressure detection period, the first transparent electrode layer 200 receives the fixed value signal, the second transparent electrode layer 400 receives the second touch detection signal, and the touch detection chip is further used to detect a signal change in each of the first touch detection electrodes. In this embodiment, the second transparent electrode layer 400 may be a non-patterned full surface electrode. Of course, the second transparent electrode layer 400 in the touch module may also consist of block electrodes, which is not limited herein.

Figure 2:
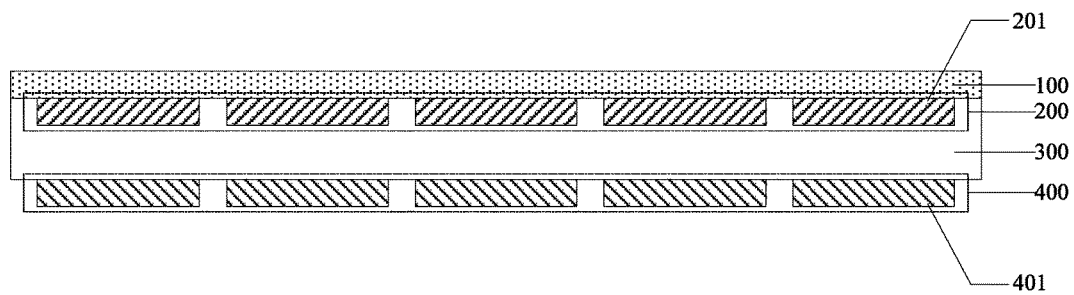

In some embodiments, as shown in FIG. 2, the second transparent electrode layer 400 in the touch module provided by an embodiment of the invention may comprise second touch detection electrodes 401 arranged in an array and insulated from each other. Moreover, the second touch detection electrodes 401 and the first touch detection electrodes 201 are in one-to-one correspondence, and the orthographic projections thereof on the flexible dielectric layer 300 or the touch substrate 100 coincide with each other.

On the basis of the second transparent electrode layer 400 as shown in FIG. 2, the touch detection chip may load a signal to the first transparent electrode layer 200 or the second transparent electrode layer 400 in the following manners during the pressure detection period.

In some embodiments, as shown in FIG. 4, during the pressure detection period, the touch detection chip loads the second touch detection signal to the first transparent electrode layer 200, while loading the fixed value signal to the second transparent electrode layer 400, i.e. the level of the second transparent electrode layer 400 at that time is relatively fixed. In this way, the change in the distance between the first transparent electrode layer 200 and the second transparent electrode layer 400 caused by the touch press would result in charging and discharging of the capacitor formed by the two transparent electrode layers. The change in the signal amount of each of the second touch detection electrodes 401 can be obtained by means of self-capacitance detection principle, thus the variation quantity of the capacitance value between the first transparent electrode layer 200 and the second transparent electrode layer 400 can be determined, thereby calculating the magnitude of the pressure. It is to be understood that, in this embodiment, it is also possible to calculate the magnitude of the pressure by detecting a change in the signal amount of the first touch detection electrode 201.

In some embodiments, as shown in FIG. 3, during the pressure detection period, the touch detection chip loads the second touch detection signal to the second transparent electrode layer 400, while loading the fixed value signal to the first transparent electrode layer 200, i.e. the level of the first transparent electrode layer 200 at that time is relatively fixed. In this way, the change in the distance between the first transparent electrode layer 200 and the second transparent electrode layer 400 caused by the touch press would result in charging and discharging of the capacitor formed between the two transparent electrode layers. The change in the signal amount of each of the second touch detection electrodes 401 can be detected based on self-capacitance detection principle, thus the variation of the capacitance value between the first transparent electrode layer 200 and the second transparent electrode layer 400 can be determined, thereby calculating the magnitude of the pressure.

Based on the same inventive concept, another embodiment of the invention provides a driving method that can be used for the touch module described in the above embodiments. As shown in FIG. 5, the method may comprise the steps of:

S501, during the touch detection period, loading a first touch detection signal simultaneously to the first transparent electrode layer and the second transparent electrode layer so as to detect a change in the capacitance value of each of the first touch detection electrodes in the first transparent electrode layer to determine the touch position.

S502, during the pressure detection period, loading a second touch detection signal to one of the first transparent electrode layer and the second transparent electrode layer so as to detect a change in the capacitance value between each of the first touch detection electrodes and the second transparent electrode layer caused by the pressure at the touch position.

In specific implementation, the signal frequencies, the duty cycles and the amplitudes of the first touch detection signal loaded in step S501 and the second touch detection signal loaded in step S502 may be the same or different, which are not limited herein.

In the driving method for the touch module provided by the embodiment of the invention, the driving method may further comprise the steps of: during the pressure detection period, loading the second touch detection signal to the second transparent electrode layer while loading a fixed value signal to the first transparent electrode layer, and detecting a signal change in each of the first touch detection electrodes.

Alternatively, in the driving method for the touch module provided by the embodiment of the invention, the driving method may comprise the steps of: during the pressure detection period, loading a fixed value signal to the second transparent electrode layer, while loading the second touch detection signal to the first transparent electrode layer, and detecting a signal change in each of the first touch detection electrodes.

In some embodiments, the second transparent electrode layer comprises second touch detection electrodes arranged in an array and insulated from each other, and the second touch detection electrodes and the first touch detection electrodes are in one-to-one correspondence and the orthographic projections thereof on the flexible dielectric layer coincide with each other. The driving method for the touch module comprises: during the pressure detection period, loading the second touch detection signal to the first transparent electrode layer while loading the fixed value signal to the second transparent electrode layer, and detecting a signal change in each of the second touch detection electrodes.

In some embodiments, the second transparent electrode layer may comprise second touch detection electrodes arranged in an array and insulated from each other, and the second touch detection electrodes and the first touch detection electrodes are in one-to-one correspondence and the orthographic projections thereof on the flexible dielectric layer coincide with each other. The driving method for the touch module may comprise: during the pressure detection period, loading a fixed value signal to the first transparent electrode layer while loading the second touch detection signal to the second transparent electrode layer, and detecting a signal change in each of the second touch detection electrodes.

On the basis of the same inventive concept, a further embodiment of the present invention further provides a display device comprising a display panel and the touch module provided by the embodiments of the present invention which is fixed to the light exit side of the display panel, and the second transparent electrode layer of the touch module is in contact with the light exit side of the display panel. The display device may be any product or component having a display function such as a mobile phone, a tablet computer, a television set, a display, a notebook computer, a digital photo frame, a navigator, or the like. The implementation of the display device may refer to the embodiments of the above-described touch module, which is not described herein for simplicity.

In specific implementation, the type of the display panel in the display device provided by embodiments of the invention is not limited. The display panel may be any one of a liquid crystal display panel, an organic electroluminescent display panel, a cathode ray tube display panel, a plasma display panel, an electronic paper or an electroluminescent display panel.

Embodiments of the invention provide a touch module, a driving method thereof, and a display device. A first transparent electrode layer, a transparent flexible dielectric layer and a second transparent electrode layer are provided below the opposite surface of the touch surface of the touch substrate. The first transparent electrode layer may comprise first touch detection electrodes arranged in an array and insulated from each other. Since the transparent flexible dielectric layer has certain elasticity, when touch substrate is subjected to a touch press, the transparent flexible dielectric layer would be compressed at the pressed point, where the distance between the first transparent electrode layer and the second transparent electrode layer would be reduced correspondingly. During the touch detection period, a first touch detection signal may be loaded simultaneously to the first transparent electrode layer and the second transparent electrode layer. Therefore, at that time, the change in the distance between the first transparent electrode layer and the second transparent electrode layer caused by the touch press would not result in charging and discharging of the capacitor formed by the two transparent electrode layers, i.e. not affecting the first touch detection signal loaded to the first transparent electrode layer. Consequently, the touch position can be determined by detecting a change in the capacitance value of each of the first touch detection electrodes, thereby realizing two-dimensional detection of touch. During the pressure detection period, a second touch detection signal may be loaded to one of the first transparent electrode layer and the second transparent electrode layer. At that time, the change in the distance between the first transparent electrode layer and the second transparent electrode layer caused by the touch press would affect charging and discharging of the capacitor formed between the two transparent electrode layers. Therefore, the pressure in the z direction perpendicular to the surface of the touch screen can be detected by detecting a change in the capacitance value between each of the first touch detection electrodes and the second transparent electrode layer, thereby realizing the pressure sensing function.

Apparently, a person having an ordinary skill in the art can make various modifications and variations to the disclosure without departing from the spirit and scope of the invention. In this way, if these modifications and variations to the present disclosure pertain to the scope of the claims of the invention and equivalent technologies thereof, the present invention also intends to encompass these modifications and variations.

The invention claimed is:

1. A touch module comprising: a touch substrate, and a first transparent electrode layer comprising first touch detection electrodes arranged in an array and insulated from each other, a second transparent electrode layer and a transparent flexible dielectric layer between the first transparent electrode layer and the second transparent electrode layer that are arranged below an opposite surface of a touch surface of the touch substrate, wherein the second transparent electrode layer comprises second touch detection electrodes insulated from each other, the second touch detection electrodes and the first touch detection electrodes being in one-to-one correspondence and orthographic projections thereof on the flexible dielectric layer coinciding with each other, wherein during a touch detection period, the first transparent electrode layer and the second transparent electrode layer are used to receive a first touch detection signal simultaneously so as to detect a change in a capacitance value of each of the first touch detection electrodes to thereby determine a touch position, wherein during a pressure detection period, one of the first transparent electrode layer and the second transparent electrode layer is used to receive a second touch detection signal so as to detect a change in a capacitance value between each of the first touch detection electrodes and the second transparent electrode layer caused by a pressure at the touch position, wherein the touch detection period and the pressure detection period are non-concurrent;

wherein the touch module further comprises a touch detection chip for providing the first touch detection signal and the second touch detection signal.

2. The touch module according to claim 1, wherein during the pressure detection period, another of the first transparent electrode layer and the second transparent electrode layer that differs from the one of the first transparent electrode layer and the second transparent electrode layer is used to receive a fixed value signal.

3. The touch module according to claim 2, wherein the touch detection chip further provides the fixed value signal.

4. The touch module according to claim 1, wherein during the pressure detection period, the first transparent electrode layer receives a fixed value signal, the second transparent electrode layer receives the second touch detection signal, the touch detection chip is further used to detect a signal change in each of the first touch detection electrodes.

5. The touch module according to claim 1, wherein during the pressure detection period, the touch detection chip is further used to detect a signal change in each of the second touch detection electrodes.

6. The touch module according to claim 1, wherein the touch substrate is a protective substrate.

7. A display device comprising:
a display panel, and
a touch module according to claim 1 which is fixed to a light exit side of the display panel, wherein the second transparent electrode layer of the touch module is in contact with the light exit side of the display panel.

8. The display device according to claim 7, wherein the display panel is selected from a group consisting of a liquid crystal display panel, an organic electroluminescence display panel, a cathode ray tube display panel, a plasma display panel, an electronic paper and an electroluminescent display panel.

9. The display device according to claim 7, wherein during the pressure detection period, another of the first transparent electrode layer and the second transparent electrode layer that differs from the one of the first transparent electrode layer and the second transparent electrode layer is used to receive a fixed value signal.

10. The display device according to claim 9, wherein the touch module further comprises a touch detection chip for providing the first touch detection signal, the second touch detection signal, and the fixed value signal.

11. The display device according to claim 10, wherein the second transparent electrode layer is composed of a planar electrode.

12. The display device according to claim 11, wherein during the pressure detection period, the first transparent electrode layer receives the fixed value signal, the second transparent electrode layer receives the second touch detection signal, the touch detection chip is further used to detect a signal change in each of the first touch detection electrodes.

13. A driving method for a touch module,
wherein the touch module comprises a touch substrate, and a first transparent electrode layer comprising first touch detection electrodes arranged in an array and insulated from each other, a second transparent electrode layer and a transparent flexible dielectric layer between the first transparent electrode layer and the second transparent electrode layer that are arranged below an opposite surface of a touch surface of the touch substrate, wherein the second transparent electrode layer comprises second touch detection electrodes insulated from each other, the second touch detection electrodes and the first touch detection electrodes being in one-to-one correspondence and orthographic projections thereof on the flexible dielectric layer coinciding with each other, wherein during a touch detection period, the first transparent electrode layer and the second transparent electrode layer are used to receive a first touch detection signal simultaneously so as to detect a change in a capacitance value of each of the first touch detection electrodes to thereby determine a touch position, wherein during a pressure detection period, one of the first transparent electrode layer and the second transparent electrode layer is used to receive a second touch detection signal so as to detect a change in a capacitance value between each of the first touch detection electrodes and the second transparent electrode layer caused by a pressure at the touch position, wherein the touch detection period and the pressure detection period are non-concurrent;

wherein the touch module further comprises a touch detection chip for providing the first touch detection signal and the second touch detection signal;

the driving method comprising:

during the touch detection period, loading by the touch detection chip the first touch detection signal simultaneously to the first transparent electrode layer and the second transparent electrode layer so as to detect the change in the capacitance value of each of the first touch detection electrodes in the first transparent electrode layer to determine the touch position;

during the pressure detection period, loading by the touch detection chip the second touch detection signal to the first transparent electrode layer or the second transparent electrode layer so as to detect the change in the capacitance value between each of the first touch detection electrodes and the second transparent electrode layer caused by the pressure at the touch position.

14. The driving method according to claim 13, wherein the method comprises:

during the pressure detection period, loading the second touch detection signal to the second transparent electrode layer while loading a fixed value signal to the first transparent electrode layer; and detecting a signal change in each of the first touch detection electrodes.

15. The driving method according to claim 13, wherein the method comprises:

during the pressure detection period, loading a fixed value signal to the second transparent electrode layer while loading the second touch detection signal to the first transparent electrode layer; and detecting a signal change in each of the first touch detection electrodes.

16. The driving method according to claim 13, wherein the method comprises:

during the pressure detection period, loading the second touch detection signal to the first transparent electrode layer while loading a fixed value signal to the second transparent electrode layer; and detecting a signal change in each of the second touch detection electrodes.

17. The driving method according to claim 13, wherein the method comprises:

during the pressure detection period, loading a fixed value signal to the first transparent electrode layer while loading the second touch detection signal to the second transparent electrode layer; and detecting a signal change in each of the second touch detection electrodes.

* * * * *